United States Patent [19]

Salin

[11] 4,041,214
[45] Aug. 9, 1977

[54] BUTTON CELL CONFIGURATION
[75] Inventor: Jean Claude Salin, Besancon, France
[73] Assignee: Timex Corporation, Waterbury, Conn.
[21] Appl. No.: 688,457
[22] Filed: May 20, 1976
[51] Int. Cl.² .............................................. H01M 2/10
[52] U.S. Cl. ..................... 429/98; 429/174; 58/23 BA
[58] Field of Search ............ 429/98, 174, 96, 97, 429/99, 162, 164; 58/23 BA

[56] References Cited
U.S. PATENT DOCUMENTS

| 2,606,941 | 8/1952 | Ruben | 429/174 |
| 2,697,736 | 12/1954 | Goldberg et al. | 429/174 |
| 3,006,139 | 10/1961 | Hug et al. | 58/23 BA |

FOREIGN PATENT DOCUMENTS 374,938  3/1964  Switzerland ............ 58/23 BA

Primary Examiner—Donald L. Walton
Attorney, Agent, or Firm—Lawrence Hager

[57] ABSTRACT

An improved button cell configuration for wristwatches which can be snapped into the case back. The button cell has an outer can configuration or shape having major and minor circumferential retaining flanges adapted to hold a gasket therebetween. The outer can flanges and gasket are arranged to mate with the case back to provide a snug snap-in and snap-out fit therewith.

2 Claims, 2 Drawing Figures

ABOUT 4,041,214

BUTTON CELL CONFIGURATION

BACKGROUND OF THE INVENTION

This invention relates generally to energy cells or batteries of small size adapted for electric or electronic watches, hearing aids, cameras, paging systems and the like.

Small primary energy cells used, for example, in wristwatches and hearing aids are well known. These are generally of a circular configuration and known as "button" cells because of their shape. Such cells are generally inserted into or removed from the watch through an opening in the case back which is locked by a screw cover. The screw cover was heretofore needed to provide a dustproof and watertight closure of the watch case and for retaining under pressure the energy cell in electrical contact with the terminal portions of the watch. Typically, the screw cover formed one of the terminal portions and was, therefore, electrically connected to the watch circuitry. Examples of such cells and their use in electric watches and the like are illustrated in U.S. Pat. Nos. 3,916,613 issued Nov. 4, 1975 to Fred Esselborn; 3,708,343 issued Jan. 2, 1973 to Gerrard Walsh; 3,846,972 issued Nov. 12, 1974 to David Doss; 3,304,708 issued Feb. 21, 1967 to T. Baehni; and 3,670,491 issued June 20, 1972 to Milton E. Weschler. These prior art energy cells are undesirable, however, to the extent that they require a screw cover which both adds to the cost of manufacture of the wristwatch and the difficulty of replacing the battery by the user.

Accordingly, an object of the present invention is to provide an improved button cell configuration whereby the need for a screw cover is eliminated.

A further object of the present invention is to provide an improved button cell configuration which can be snapped-in and snapped-out of a watch or other device.

A still further object of the present invention is to provide an improved button cell configuration whereby electrical contact is established directly between a terminal of the button cell and the watch case without the need for a screw cover.

Another object of the present invention is to provide an improved button cell configuration which, when inserted into a wristwatch, provides a dustproof and watertight seal between the button cell and watch case.

The accompanying drawings diagrammatically illustrate an embodiment of the present invention by way of example. Like numerals refer to like parts throughout.

DRAWINGS

FIG. 1 is a horizontal cross section of the preferred form of the energy cell, and FIG. 2 is a perspective view, partially cutaway, of an energy cell especially suited for and shown in an electronic wristwatch.

DESCRIPTION OF THE PREFERRED EMBODIMENT

Figure 1:
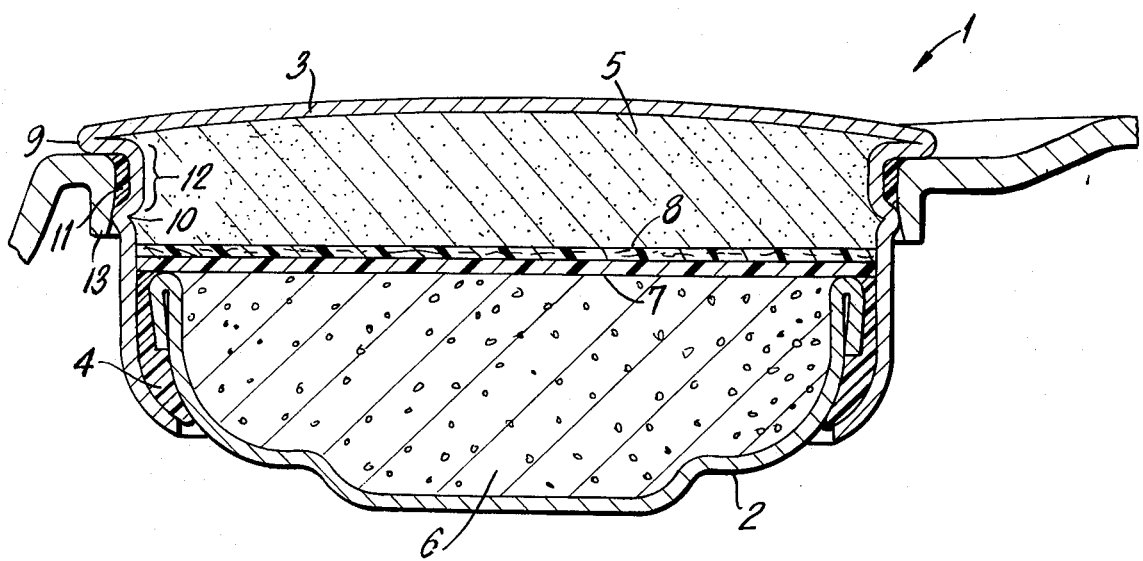

As shown in FIG. 1, the battery 1 of the present invention includes a bottom can or casing member 2 which can be formed from a conductive material, for example, of a duplex stainless steel phosphor bronze material. The bottom can 2 provides one terminal of the cell, the other terminal being provided by the top cap 3. An annular grommet 4 is positioned between the top cap 3 and the bottom can 2 and electrically insulates the two terminals of the cell.

The internal active materials of the cell, which may be more or less conventional and which are not material to the present invention, are briefly described as follows with reference to FIG. 1. The top cap 3 contains the anode material 5, which may, for example, be a zinc amalgam which is compressed within the top cap 3. Prior to final assembly of the battery, a suitable alkaline electrolyte, such as potassium hydroxide or sodium hydroxide is added to the zinc amalgam anode.

The bottom can 2 contains a depolarizing cathode material 6 such as a mixture of mercuric oxide with a small percentage of graphite.

Separating the anode and cathode materials is a barrier membrane 7, for example, of suitable plastic microporous membrane material, and a cellulosic absorbent separator 8.

In accordance with the preferred embodiment of the present invention, the top cap 3 includes, as an integral portion, major and minor circumferential retaining flanges 9 and 10 respectively, adapted to hold therebetween a gasket or grommet-like ring 11. The major retaining flange 9 has a circumference which is greater than the circumference of the minor retaining flange 10. The minor retaining flange 10 is contoured and dimensioned to enable the cell to be inserted smoothly into the watch case and to provide radially outward pressure against the watch case. The flexing or contracting of the minor flange 10 is provided, for example, by the spring bias action of the concave or U-shaped portion 12 of the top cap 3. The flexing and outward pressure of the top cap 3 against the watch case may be enhanced by the use of a suitable annular grommet 4 which is capable of being compressed or expanded with a change in the pressure being applied thereto by the downwardly extending end portion of the top cap 3.

Figure 2:
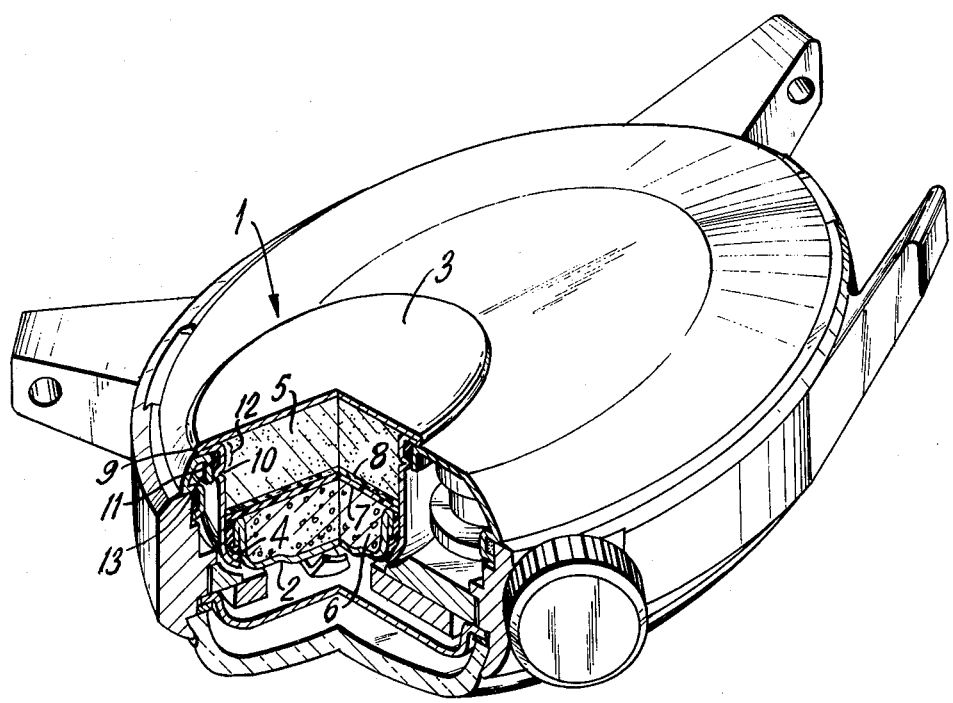

As shown in FIG. 2, the major flange 9 is shaped and dimensioned to form a retaining ledge which overlaps the case back when the battery is inserted therein. It should be noted, however, that the retaining ledge can be of any shape or size, for example, elliptical, square or triangular, so long as a retaining ledge or rim or similar battery can portion is provided to enable snap-in and snap-out replacement of the cell by the user. The minor flange 10 is shaped and dimensioned to have a snug fit with the juxtaposed case back member 13 and is thereby held, for example, under pressure, in electrical contact to the case back. The annular gasket 11, as noted above, provides an annular seal between the case back member 13 and the battery to substantially prevent dust and water from entering into the body of the watch.

OPERATION

If the button cell is to be exchanged, the button cell can be easily removed from the watch case by wedging an object such as a knife or fingernail between the retaining ledge of the battery and the case back thereby prying the battery upward and out of the watch. Next, the new battery is snapped-in place in the case back to nest snuggly within the watch.

The energy cell above described is particularly useful in electric devices, such as electric watches, where the case of the device and the energy cell, when inserted, are in electrical contact to provide a reference potential path for the device. Thus, for example, if the case of the device is formed from an electrically conductive material, reliable electrical coupling will be provided between the battery cap-terminal portion and the device by mere insertion of the battery into the device.

While there has been shown what is considered to be the preferred embodiment of the invention, it is desired to secure in the appended claims all modifications as fall within the spirit and scope of the invention such as the use of electrically conductive plastic to form the case of the device and/or battery.

What is claimed is:

1. An improved energy cell for a watch or hearing aid having a case with an opening for inserting the cell therein, wherein the improvement comprises:
   an outer container for said cell having a retaining ledge portion having a first circumference,
   flange means having a circumference less than said first circumference and having a concave portion for flexing to exert a pressure against the case when said cell is inserted into the opening in the case for holding said cell in the opening of the case, and
   gasket means affixed between said retaining ledge portion and said flange means for forming a seal between the opening in the case and the cell whereby dust and moisture are substantially prevented from entering into the interior of the case.

2. An improved button-type energy cell for a wristwatch having a case with a circular opening for inserting the cell therein, wherein the improvement comprises:
   an outer container for said cell having a circular rim with a first circumference,
   a circumferential flange means having a circumference less than said first circumference and having a portion shaped for flexing to exert a pressure against the case when said cell is inserted into the opening in the case for holding the cell in said opening of the case to make electrical contact with the case, and
   circumferential gasket means between the rim and the flange and contoured to provide a circumferential seal between the opening and the cell and to also exert pressure against the case for holding the cell in said opening.

* * * * *